United States Patent
Berger et al.

(10) Patent No.: US 6,426,814 B1
(45) Date of Patent: Jul. 30, 2002

(54) SPATIALLY SWITCHED ROUTER FOR WIRELESS DATA PACKETS

(75) Inventors: Josef Berger, Santa Clara; Irv Rosenbluth, Cupertino, both of CA (US)

(73) Assignee: CALY Corporation, Sunnyvale, CA (US)

(*) Notice: Subject to any disclaimer, the term of this patent is extended or adjusted under 35 U.S.C. 154(b) by 0 days.

(21) Appl. No.: 09/433,542

(22) Filed: Nov. 3, 1999

Related U.S. Application Data (63) Continuation-in-part of application No. 09/417,416, filed on Oct. 13, 1999.

(51) Int. Cl.[7] .............................. H04J 14/00; H04L 12/28
(52) U.S. Cl. ....................... 359/117; 343/753; 370/351; 370/338; 370/389; 370/410
(58) Field of Search ..................... 343/753; 370/351, 370/338, 389, 410; 359/139, 117

(56) References Cited

U.S. PATENT DOCUMENTS

| | | | |
|---|---|---|---|
| 3,680,123 A | 7/1972 | Bryant et al. ............ 343/113 R |
| 3,827,055 A | 7/1974 | Bogner et al. ................ 343/754 |
| 3,833,909 A | 9/1974 | Schaufelberger ............ 343/754 |
| 4,287,519 A | 9/1981 | Doi .............................. 343/725 |
| 4,309,710 A | 1/1982 | Cassel ......................... 343/754 |
| 4,359,741 A | 11/1982 | Cassel ......................... 343/754 |
| 4,531,129 A | 7/1985 | Bonebright et al. ......... 343/754 |
| 4,791,427 A | 12/1988 | Raber et al. ................. 343/754 |
| 5,231,634 A | 7/1993 | Giles et al. .................. 370/95.1 |
| 5,677,796 A | 10/1997 | Zimmerman et al. ........ 359/654 |
| 5,821,908 A | 10/1998 | Sreenivas ............... 343/911 R |
| 5,828,663 A | 10/1998 | Ikjegami ...................... 370/347 |
| 5,936,949 A | 8/1999 | Pasternak et al. ........... 370/328 |
| 6,072,437 A * | 6/2000 | Zimmerman et al. ....... 343/753 |
| 6,125,279 A | 9/2000 | Hyziak et al. ............... 455/445 |
| 6,169,910 B1 * | 1/2001 | Tamil et al. ................. 455/562 |
| 6,229,500 B1 * | 5/2001 | Caille et al. ................. 343/909 |

FOREIGN PATENT DOCUMENTS

FR  2777117 A1 * 10/1998 .......... H04Q/16/02

* cited by examiner

Primary Examiner—Leslie Pascal
Assistant Examiner—Christina Y. Leung
(74) Attorney, Agent, or Firm—Thomas Schneck (57) ABSTRACT

A wireless radio communication scheme in which data packets scheduled for transmission to spatially diverse locations are directed by a switched router apparatus capable of switching data packets and transmitting them between network nodes, where the direction and timing of switching is controlled in real time by the information derived from the packet's route destination and the network's node spatial topology. The present invention uses a very high speed electronically controlled switched array feed for the microwave frequency range above 1 GHz, coupled to an RF focusing and collimating antenna that enables the wireless transceivers nodes to spatially switch data packets towards other wireless transceivers nodes based on the data packets routing, scheduling and link availability information.

44 Claims, 6 Drawing Sheets

SPATIALLY SWITCHED ROUTER FOR WIRELESS DATA PACKETS

CROSS-REFERENCE TO RELATED APPLICATION

This is a continuation-in-part of U.S. patent application Ser. No. 09/417,416, filed Oct. 13, 1999.

TECHNICAL FIELD

The present invention relates to the field of wireless communication in general, and in particular, to a router for switched array antennas for high capacity wireless broadband networks.

BACKGROUND ART

Wireless communication at high frequencies in the range of 1 GHz to more than 100 GHz are used extensively for point-to-point (PP) and point-to-multi point (PMP) communication. For these high frequencies, three types of antennas are commonly used for spatial directional data transmission. Parabolic reflector antennas are used for a fixed narrow spatial direction of transmission. Sectorial horn antennas are used for fixed wide area transmission. Patch antennas are used for fixed direction transmission as well. Those antennas have fixed lobe patterns aligned towards transceivers located in a well defined spatial sector. Once the data link is defined the antennas transmit and receive data from those fixed directions, based on the MAC (Media Access Control) layer either in a circuit connection form, in broadcast form or in a polling form. In PP and PMP systems, the transceivers' antennas at both sides of each link have to be aligned to face each other and the antennas' alignment is usually done manually during the initial link commissioning. When setting up a PMP link, the antenna beams at both sites have to be aligned simultaneously towards each other to reach maximum received signal. In PMP systems, the base station often includes fixed sectorial antennas that are set initially to radiate in well defined sectors, e.g. four low gain antennas of 90 degrees that are positioned to cover 360 degrees. Thus, a subscriber's antenna has a narrower spatial divergence to increase its gain, is aligned towards the base station location in azimuth and elevation until maximum reception is achieved. This alignment guarantees that the base station is also receiving maximum transmission signal via its large lower gain fixed sectorial antenna.

Data packets transmitted and received by the antennas are coming from the same directions. In the case of PMP system that uses FDM B frequency division multiplexing, or TDM B time division multiplexing, or other modulation technique, the base station can broadcast information dedicated to specific transceivers located in a sector. All other transceivers in the same sector will receive the data, decode it, but will ignore it once it is found that the data is not aimed for them. However, by sharing the sector among many transceivers, only a limited amount of data packets can be forwarded simultaneously among the transceivers when transmitting at the same frequency.

The process of alignment in both PP links or in the case of adding a new subscriber at a PMP system is done off-line prior to service activation and involves accurate mechanical adjustment while monitoring the received signal level. In DBS (Direct Broadcast System—a PMP using a satellite), antenna alignment is done in a similar way to terrestrial PMP system. At the subscriber location, the antenna is aligned towards a geostationary satellite until a good signal is detected, and then it is fixed mechanically towards that direction. In all of the above-described cases, the antenna's aperture is aligned mechanically towards the broadcasting source or towards each other before establishing the communication link and starting the service. Based on the received signal level, the direction is mechanically adjusted, sometimes by motor driven antenna, and fixed to the specified direction of maximum reception and transmission.

Few techniques are used to route or direct data towards different transmission directions. The most common is to locate a base station with multiple transceivers, each one with its own separate antenna, where each antenna covers a different sector. The base station MAC layer switches the data at baseband to the transmitter, which covers the sector that contains the subscriber transceiver site where the data packets are aimed. At a PMP base station, typical sectorial antennas such as horn antennas are designed to cover fixed 90, 45, 30 or 15 degree lobes in the horizontal plane and about 7 degrees in the vertical plane. The subscriber antenna, on the other hand, is designed with much narrower beam sensitivity, i.e. higher gain, with similar divergence in horizontal and vertical planes, usually less than 7 degrees. Horn antennas, lens corrected horns and parabolic antennas are commonly used for the subscriber transceiver. Other PMP systems use a subscriber radio with an antenna that receives the down-stream data from the base station in one polarization, say horizontal, and transmits upstream in a perpendicular polarization, say vertical, towards the base station, thus increasing network capacity. In all of the above cases, the spatial capacity in a sector is fixed by the alignment of the antennas.

Phased array antennas allow beam steering by controlling the phase of each antenna element relative to phase of the other elements thus allows beam steering. Those antennas are complicated to control in a very short duration imposed by the burst nature of the packets of data. Thus, phased array antennas are currently used only in some advanced cellular base stations to establish circuit connections for relatively long duration data transmissions, such as in circuit oriented networks where the duration of voice conversation is relatively much longer than packets of data. Phased array antennas are used primarily at low frequencies, typically less than 2.5 GHz, to get high directionality in a multireflections environment. The complexity, high cost and high loss of components, namely phase shifters, at high frequencies prevent use for mass commercial applications.

A simple solution for switching data packets towards different transceivers at different directions is by fast switching the final output energy between different sectorial antennas located in different angles, in say the horizontal plane, thus covering a large field of view. This configuration, however, demands a multiplicity of antennas, each one aimed in a different direction with a multiplicity of transmitters and connection lines to feed those antennas. RF energy needs to be switched and then transported, via long waveguides or coax, to each antenna. The distance from the switches to the antennas creates large signal attenuation, which increases at higher frequencies, and demands increased antenna structural dimensions, cost, and can be environmentally objectionable. Thus, an objective is to control a very fast switch for millimeter waves using a high frequency switched antenna array, with the switch located in close proximity to the antenna array. This is needed to allow high bit rate packets modulating high frequency RF to be efficiently switched towards different transceivers in different spatial directions.

SUMMARY OF THE INVENTION

An example of spatial routing of data packets in the space between arbitrarily distributed wireless nodes is described by Berger at el. in U.S. patent application Ser. No. 09/187,665 entitled "Broadband Wireless Mesh Topology Networks", filed Nov. 5, 1998, incorporated by reference herein. The wireless network nodes are designed to select a transmission direction and a receive direction based on the routing address of the data packets to be sent and/or received. The selection of a transmission or receiving direction is done instantaneously to accommodate short bursts of data packets arriving from nodes located at different directions or transmitted towards nodes located at different directions, as defined by the scheduler of the MAC layer of the network nodes, as explained in the prior applications. A communication protocol that is designed to support the scheduling of spatially routed packets between network nodes in any generic topology such as mesh, tree and branch and PMP, is described by Aaronson at el. in U.S. patent application Ser. No. 09/328,105 entitled "Communication Protocol for Packet Data Particularly in Mesh Topology Wireless Networks", filed Jun. 8, 1999, incorporated by reference herein. The description of the media access control (MAC) layer is particularly pertinent.

The presently disclosed spatially switched router (SSR) describes a way of designing a data packet switching and routing apparatus capable of switching data packets and transmitting them spatially between wireless network nodes. The MAC layer defines, in real time, the direction and time of the RF switching, thus directing data packets based on the packets routes, destination and the network's node spatial location. The prior applications explain that RF switching is established by schedules, held at each node whereby packets are directed and received from specified, spatially separated, nodes at appointed times. This MAC protocol is assumed in the present invention such that transmission and reception timing and the corresponding desired direction of transmission or reception are known in advance. However, other packet protocols can be used with address decoding and routing information obtained by decoding of the packets.

The SSR apparatus enables the switching of transmitted and received data packets from one node to other neighboring nodes and from multiple nodes located at different direction and distances to other nodes in their surroundings. Fast switching is accomplished by applying fast, in the range of few nanoseconds to a few microseconds, control signals to a series of microwave switches, synchronously with the data packet transmission and reception timing and synchronously with the direction of transmission and reception. The fast RF switches are designed in a configuration that delivers large isolation between the receiver and transmitter input ports and minimizing the RF losses. The design allows close proximity of the switches to the output feeding ports to reduce coupling and transmission losses especially important at very high frequencies (>20 GHz). An n×m switch assembly (n=number of input ports, m=number of output ports) is designed based on a series of custom made 2×4 integrated RF switches made of GaAs integrated circuits (MMIC), designed for the very high microwave frequencies (>20 GHz) and a switching array assembly structure closely coupled to the focusing and collimating antenna structure.

A principal feature of the current spatially switched router apparatus is its wireless spatial packet routing and switching capability to form a "connection-less" communication link between a multiplicity of dispersed nodes in a mesh topology network or any other derivative of a mesh topology network such as tree and branch and/or PMP. At the very high microwave frequencies, the system may require a line-of-sight (LOS) between the communicating nodes. The spatial transmission of data packets, such as internet protocol (IP) packets, towards specific directions of the destination nodes allows multiple nodes to transmit at the same time, at the same frequency band and in the same area with minimum mutual interference. This synchronized mesh network increases the available capacity of the network dramatically relative to the common "connection oriented" networks, used in many PMP systems. In those PMP systems, the bandwidth at certain sectors is defined up front by the antenna's fixed illumination pattern. The spatially switched router apparatus of the present invention can perform fast route diversity and fast load balancing, taking full advantage of the bursty nature of the IP data packets traffic.

The present invention is optimized for the very high radio frequencies, such as the FCC assigned LMDS (Local Multipoint Distribution Systems) spectrum, 27 GHz to 31 GHz, and other spectra that are assigned to operators on a regional basis. Those frequencies bands allow large amounts of data distributed at such frequencies, as 10.5 GHz (UK, Latin America) 24.5–26.5 ; (Europe) 38 GHz–40 GHz (U.S.) etc. At those frequencies, the attenuation of transmission lines is very high. Thus, the current design is made of a very compact switch array matrix that is closely coupled to multiple feeding ports, which are designed to feed multiple, focusing and collimating ports of a beam forming optics apparatus operating at radio frequencies. One of the beam forming apparatuses described in this invention comprises a known multi-layer, graded-index, cylindrical lens that forms a one dimensional, say horizontal focusing device, wherein the other dimension, say vertical, divergence is defined by the aperture size of the feeding port horn. This apparatus design allows the formation of beams with different divergences in the horizontal plane, where the horizontal plane is the switching plane, and the vertical plane.

In a different beam forming apparatus of the present invention, the feeding ports feed a multi-layer graded-index spherical lens, such as an RF Luneberg lens, to form beams with similar divergence in the horizontal (switching) plane, and the vertical plane. In both devices, beam switching can cover angles in excess of 120 degrees with very high gain and collection efficiency from different directions inside the sector. The packets of data modulating the RF carrier are switched to focal points, where beams from different focal points are collimated to destination directions. All the beams share the same lens, and use an overlapping aperture, of the cylindrical or spherical lens, thus significantly decreasing the size of the wireless node antenna. The smaller size allows lower losses of RF energy coupled through the antenna, lower weight and minimal intrusion in the environment.

BEST MODE FOR CARRYING OUT THE INVENTION

Figure 1:
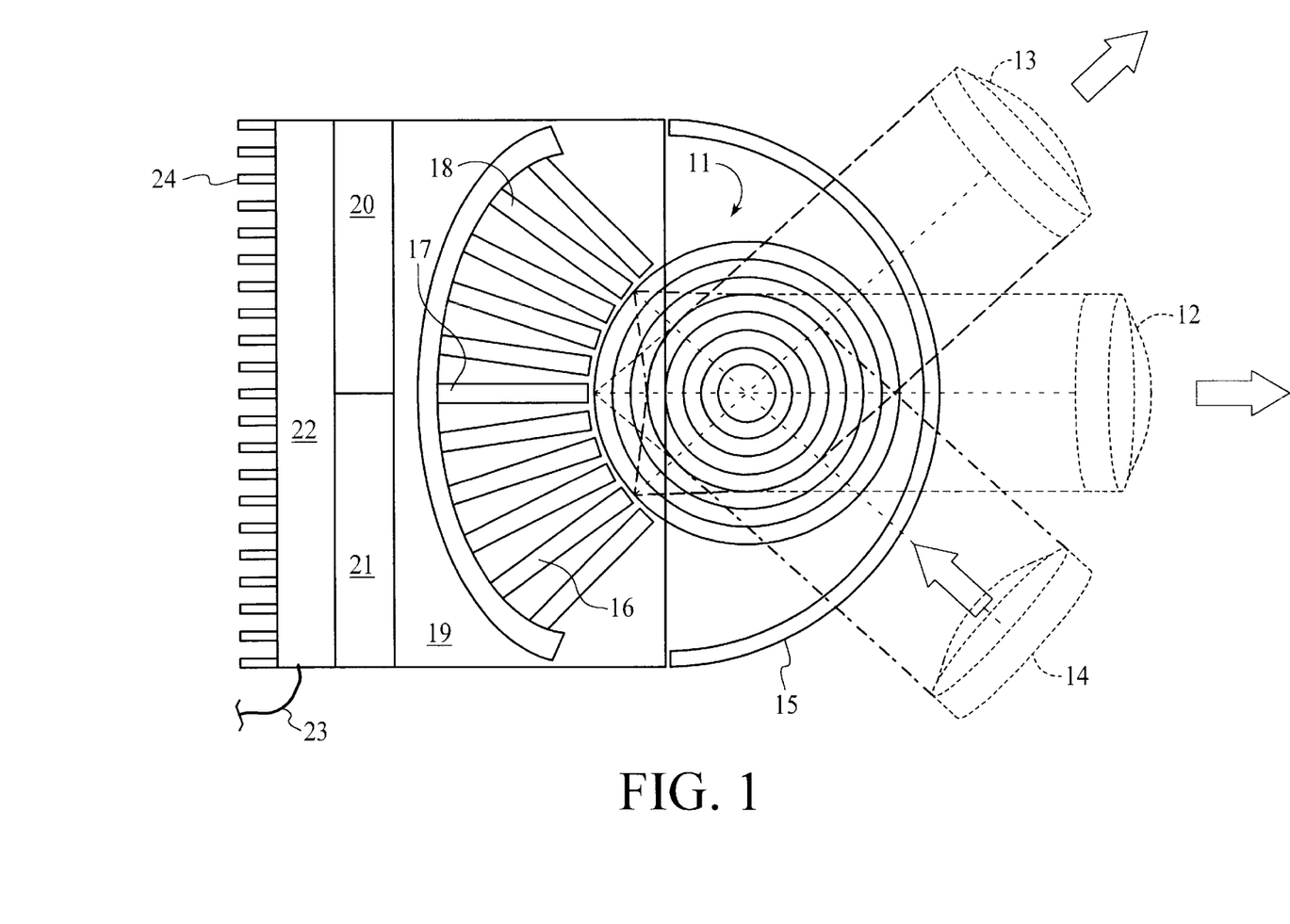
FIG. 1 is a top plan view of a wireless node with a spatially switched router apparatus for wireless data packets comprising a spherical or cylindrical graded index RF lens to be used in a network in accord with the present invention.

With reference to FIG. 1, a wireless router transceiver node in accord with the present invention is shown incorporating an RF switch assembly coupled to an RF optics focusing and collimating apparatus. This apparatus is a graded index RF lens which may have a spherical or a cylindrical lens shape. The term "RF optics", as used herein, means a device operating at radio frequencies, but having optical wave effects on radio waves, such as lens effects. The transceiver comprises a local-port 23 that communicates with local networks. The local-port 23 and similar multiple ports, may incorporate a wire connection such as twisted pair for 10/100 base T Ethernet connection, fiber optic connection or wireless transceivers, dedicated for separate local access via frequencies such as ISM (industrial-scientific-medical) bands (2.4 GHz and/or 5.7 GHz) or the MMDS spectrum.

A central processing unit 22 processes data packets received and transmitted via the local ports 23 and over the air from the remote network nodes. The CPU 22 supplies control signals to activate a switch assembly in a synchronous timing sequence to switch data packets arriving from different directions to the proper receiver and transmitted data packets towards the proper remote node directions. Assume that the remote nodes are located at different directions, say directions corresponding to the beams propagation towards directions 12, 13 and 14. The MAC layer used in this invention as an example is based on a pre-established schedule of routing information, particularly the data packets' routing path and destination, priority, and links availability, determines the data packet routing direction and transmission or reception timing at each node, as more fully described in application Ser. No. 09/328,105, mentioned above. For example, packets received from a node associated with direction 14, shown in FIG. 1 by an (RF Pulse) propagating towards the RF lens, are stored, processed, sorted and routed to either the local port 23 or towards nodes associated with other remote nodes such as directions 12 or 13 (see "RF pulses" shown in FIG. 1 propagating in the direction 12 and 13). If routing information is not known beforehand, packets must be decoded to obtain the information.

The receiver 21 comprises an RF low noise amplifier, down converter, IF receiver, analog-to-digital converter and demodulator. The transmitter 20 comprises a modulator, digital-to-analog converter, IF transmitter, up-converter, and RF power amplifier. The system 20 and 21 also includes local oscillators, high frequency oscillators and phase lock loops in accordance with standard high frequency radio transceiver design.

The RF microwave switch assembly 19 comprises an array of RF switches to be described below with reference to FIG. 3. The microwave switch assembly is activated by the control signals applied by the central processing unit 22. The control signals switch data packets, now modulating the radio frequency signal generated by the transmitter 20, to one of the multiplicity of RF feeders, such as feeders 16, 17, or 18. The feeders may be standard microwave horns. Those feeders direct the RF signal to the focal point of the RF lens 11. Lens 11 is preferably a Luneberg lens of the type shown in U.S. Pat. No. 4,309,710. Based on the synchronous control inputs from the central processing area 22, the fast microwave switches routes packets of data to and from the different ports 16, 17, 18, and others. The feeders transfer the RF frequency to the focal points around the lens 11. Lens 11 collimates beams, for example from feeder 17 to the remote node or nodes, located in direction 12, or from feeder 16 to the direction 13.

The same feeders may also serve as receiving ports for RF microwave energy arriving from different antennas. For example, the RF beam from remote node in direction 14 is focused towards feeding-port 18 and synchronously, switched by the switch assembly 19 towards the receiver 21. Thus, a single lens and a switch array assembly structure is used for both transmitting and receiving packets of data, minimizing the size of the transceiver antenna together with an increase of the field of view. In a time division duplex (TDD) mode, the same switch assembly 19 is used for the transmit and receive functions, thus reducing the cost of the transceiver and allowing better matching of the burst flow associated with data packets relative to the transceiver output and input bandwidth.

The RF lens 11 has a radom 15 designed to protect the RF lens material from accumulation of dirt, ice, and rain directly on the lens surface. A heat sink 24 dissipates heat generated by the transceiver and the router electronics.

Microwave lens 11 focuses microwave beams from different directions, say from directions 12, 13 and 14 into the waveguide feeders, say feeders 17, 16 and 18, respectfully, located around the circumference of the lens to cover a large field of view that can extend over 120 degrees. The focusing of the RF energy is done by means of graded index dielectric layers centered one around the other, where the high index of refraction layers are in the center. The index of refraction decreases as the diameter of the lens increases. The index of refraction is based on Luneberg expression, where the index of refraction of a spherical lens has ideal imaging properties.

The RF frequency index of refraction distribution n(r) for a Luneberg lens extends over a finite radius r, and is given by:

$$n(r)=(2-r^2/a^2)^{1/2}, \text{ for } r<1. \qquad \text{Equation (1)}$$

$$n(r)=1 \text{ for } r>1 \text{ or } r=1. \qquad \text{Equation (2)}$$

where r is the distance from the sphere (or cylinder) center and a is the sphere (or cylinder) radius. Luneberg lenses use a spherical symmetry and have maximum concentration at focal points near the sphere or cylindrical surface for beams of rays arriving from different directions.

Due to the longer wavelength of microwave RF frequencies, usually many millimeters, the lenses are usually implemented by the formation of multiple dielectric spherical shells, usually made of half shells, inserted inside each other and made of variable steps of index of refraction.

Figure 2:
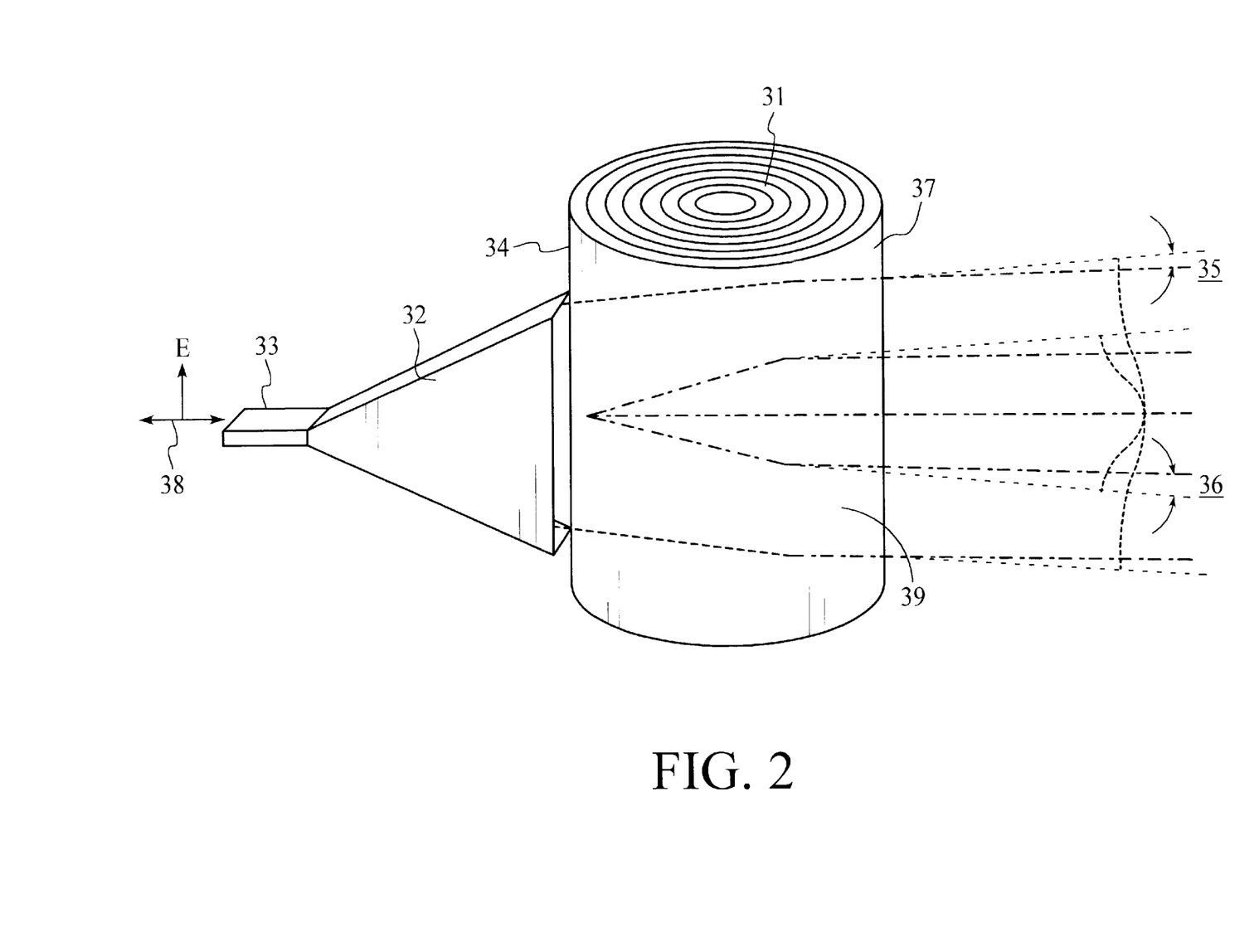
FIG. 2 is a side plan view of a cylindrical type RF optics focusing and collimating antenna with a feeding port used in the spatially switched router apparatus of FIG. 1.

In the current invention, a cylindrical lens is also described in order to achieve an asymmetric beam forming apparatus. This cylindrical lens is also shown in FIG. 2. The graded index multi-layer microwave cylindrical lens is made of multiple cylindrical tubes with variable diameter one inside each other, where the graded index of each layer is reduced as the layer diameter increases. The core is a cylindrical rod with the highest index of refraction approaching $n(r\sim0)\sim(2)^{1/2}$.

The one dimensional cylindrical microwave lens 31 implementation of the current invention is easy and inexpensive to manufacture. The cylindrical design of FIG. 2 allows collimation of the diverging feed energy from feeding port 33 in a divergence based on the lens graded index variation relative to the cylinder radial dimension a in Equation (1). The use of multi-layer cylindrical elements to form lens 31 allows the design of high volume manufacturable lenses by forming long tubes with different indices of refraction (say approximately 10 different type of tubes), inserting them inside each other and then cutting the cylinder to the appropriate length dimension to generate multiple lenses. The length of the cylindrical lens is defined by the size of the feeding aperture and is made to be compatible with the beam vertical diffraction inside the cylindrical lens.

In the cylindrical configuration design of FIG. 2, the vertical aperture is defined by the horn vertical aperture which defines the vertical beam 32 diffraction from the feed from source 33 at the elongated focal plane along the cylindrical surface and parallel to the lens axis. A degree of freedom exists to design a different beam divergence for the horizontal and vertical planes based on the applications and the node covering angle.

In a spherical lens design case, a similar beam divergence is formed for the horizontal and vertical dimension. The output port can be implemented by a waveguide feed or a patch feed design. Other techniques such as flared waveguides can be used to form beam gain variation in specific planes.

In FIG. 2, the horn 33 is feeding graded index cylindrical lens 31. Multiple horns are located in a sector around the cylinder, as shown in FIG. 1. The divergence of the beam in the vertical plane is reduced by controlling beam expansion from the feeding-port 33 using horn 32, which expands the RF beam in one dimension only, along the cylindrical axis of the antenna. The horn leads from the switch array assembly, to the focal surface of the lens 34. The horn 32 has a horizontal dimension kept smaller than approximately the size of −½ the RF frequency wavelength, thus allowing the horizontal emitted beam to be expanded and collimated by the cylindrical lens graded index structure. The narrow horizontal horn dimension allows the positioning of multiple horns side by side to achieve high resolution in the switching plane. The vertical divergence 35 is usually less than 7.5 degrees and can be designed to be a different size based on the needed gain for each of the beams in the horizontal plane 36, i.e. the switching/steering plane. The lens 31 is seen to have a variation in the graded index layers. The lens 31 has an output aperture 37 that is partially shared among the multiplicity of the feeding ports. Feeding port 33 has an input polarized beam 38, where E is the field polarization, coming from the switch assembly and extending to t he feeding-ports horn 32.

An advantage of a cylindrical design for the lens is having feeding ports with a narrow aperture in the horizontal plane, i.e. the switching plane, thus allowing the co-location of multiple feeding ports around the lens periphery, thus increasing the resolution and gain of the multiplicity of beams. The multiplicity of narrow beams each one of them with narrow divergence and higher gain (high spatial resolution) in the switching plane, allows the multiple use of the same frequencies in the same lens coverage area and also allows an increased bit rate in each direction due to higher gain in the aimed narrower sector.

The RF beam polarization is defined by the orientation and dimensions of the design of the horn waveguide feeds, or alternatively, the patch antenna feed design. The graded index lens configuration can be used for both polarizations in cases where the system design uses transmitting in one polarization and receiving in the perpendicular (other) polarization. In FDD (frequency division duplex) PMP (point to multipoint) systems for example, the transmitting feeds could be located above or below the receiving feeds using the same cylindrical lens. In this way, both transmission and receiving can take place simultaneously at a different frequencies. The same can be done at different frequencies and different polarizations to increase transmit-receive isolation even farther while transmit and receive take place simultaneously. In those PMP FDD systems, the single lens configuration allows high resolution in sectorial selections around the base station location.

Instead of waveguide beam feeders, a multiple patch antenna's feeds direct RF energy to a curved surface located at focal points of the lens, can be used as well. In the case of patch antenna feed, a symmetrical dimension feed is used for spherical lens feeds or an asymmetrical design is used for cylindrical lens feeds. Certain lens feed designs may also incorporate structures that employ apodization for side lobe suppression.

Another design that incorporates a cylindrical lens can be used simultaneously for transmit and receive signals, usually at different frequencies. This design locates the receiver's feeds in one plane around the lens and the transmitter's feeds in a plane above or below the receiver feeds. In this design, the receiver feeds are isolated from the transmitter feeds, thus simultaneous operation can take place, either at the same frequency with different timing or on separate frequencies at the same time. This allows the elimination of a transmit and receive diplexer in a frequency division duplex (FDD) design or the T/R (transmit/receive) switch in the TDD design, Receiving and transmitting from different direction at the same time can also increase the isolation. In both cases, lower RF losses are achieved together with an increase of bandwidth.

Figure 3:
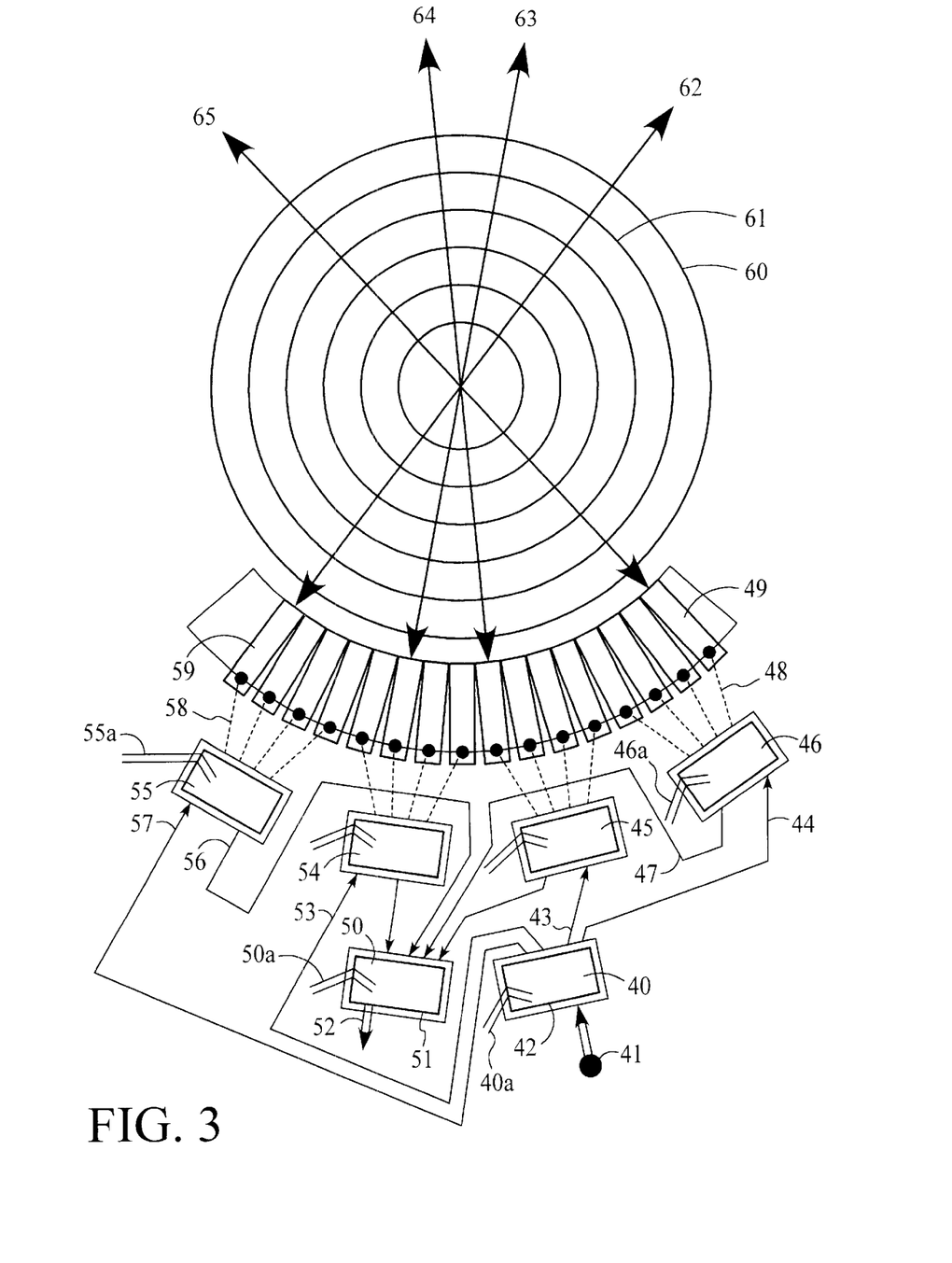
FIG. 3 is a top plan view of an RF switch assembly for use in the spatially switched router apparatus shown in FIG. 1.

In FIG. 3, a data packet switch employs 2×16 ports in a switch array. Different switch configurations such as 2×4, 2×8, 2×32 share a similar design concept and could be used. In the 2×m designation, 2 defines the input and output ports, from the transmitter and towards the receiver, the m defines the number of feeding ports towards and from the antenna. Those ports correspond to the different spatial switching directions. A key advantage of the current data packet switched router invention design is the high isolation achieved between the transmitting signal at transmitter input port 41 and the receiver input port 52. That isolation exceeds 60 dB, typically better than 75 dB. This is necessary in order to be able to switch from transmitting of short bursts of data packets to the receiving of short bursts of data packets, without saturating the receiver or changing the operating point of the power amplifier. This large isolation is achieved by having switches designed with greater than 30 dB isolation between each one of the ports and having 2×m (m>1) type switches 46, 45, 54, 55 between the transmit switch 40 and the receive switch 50. In general, switches 40 and 50 could be either 1×n or 2×n type switches. In the 2×n switch, the extra port is used for testing purposes to allow monitoring with external test equipment of the different parameters of the data packet switch array. Different monitoring and testing can be performed, including routing signals from different ports to the transmitter test ports 42 and/or the receiver test port 51.

When any feeding port is switched to the receiver, the associated transmitter port is switched off. Thus, isolation is achieved by the double cascaded isolation between the transmitter port and the received signal path. Say that a signal from the feeding port 49 is fed to port 48 of switch 46. The received signal is switched by switch 46 to line 47, and fed into receive switch 50, which in turn is switched to connect line 47 to a port with output line 52 that leads to the receiver. The transmitter port 41 is switched off at the time the receive packets arrive. Thus, port 41 is isolated from port 44 by more than 30 dB, and port 44 is switched off as well at switch 46, thus adding additional isolation of greater than 30 dB between port 44 and any ports at the switch 46. Thus, line 47 of switch 46 is isolated from port 41 by more than 60 dB. This leads to isolation greater than 60 dB between the receiver port 52 and the transmitter port 41.

The RF signal from the transmitter is fed into switch 40 via input port 41. Synchronously with the arrival of the data packets to the input port 41, the switch 40 is momentary enabled by control signals on line 40*a*, changing the voltage on its internal input diodes connected to port 41, and one of the diodes at one of the output ports. The RF energy that carries the data packets is transferred via the switched diodes, which form the ports, towards one of the switches in the second layer that feeds the antenna. For example, the control voltage switches the RF energy entered at input port 41 towards transmission line 47 that transfers the modulated RF to switch 46. The control voltage signal is also applied synchronously to switch 46 using control signals 46*a*, which switch RF energy to port 48 that couples the energy to waveguide 49. In turn, waveguide 49 feeds the lens 61 which collimates the beam in the direction 65. At the end of the duration of the data packets, the control voltage is changed to turn off the RF path connecting ports 48 and 44 of switch 46 as well as the RF path between ports 42 and 41 of switch 40. During the reception of data packets via port 49, from direction 65, a control bias voltage is applied to the switching diodes at port 48 and 44 of switch 46, and the diodes connected to transmission line 47 and port 52 at switch 50, as explained below with reference to FIG. 6. This enables the connection of feeding port 49 to the feeding port 52 that leads to the receiver.

Switching the transmit packets to direction 62 is done in a similar way by applying the control signals 40*a* to switch 40 and 55*a* to switch 55. The switch assembly thus connecting the signal from input port 41, to port 57 of switch 55, transmitting port of switch 55, and then to port 58 leading to the feeding-port 59.

To receive data packets from direction 62, the control signals 50*a* and 55*a* switch both the receive switch 50 and the feeding switch 55 to allow the modulated RF signal from direction 62 to pass through from the feeding port 59, port 58 to the receiver port 56 of switch 55 and from there to the output receiver port 52 that leads to the RF receiver.

Different combinations of switching routes are possible with the above-described array, among others. The ability to transmit simultaneously into multiple directions by splitting the energy to multiple feeding ports is present.

The present invention uses a new 2×m port switch assembly comprising very high-speed switches connecting to antenna feeding ports. This type of switch design, with separate transmit and receive ports, allows in addition to high isolation, the creation of a loop back of RF signals. The loop back of RF signal is enabled by, for example, switching port 41 to 44 in switch 40, and port 44 to line 47 in switch 46 and line 47 to port 52 in switch 50. This allows measurements of the losses and functionality of the different sections and elements of the data packet switch array.

Figure 4:
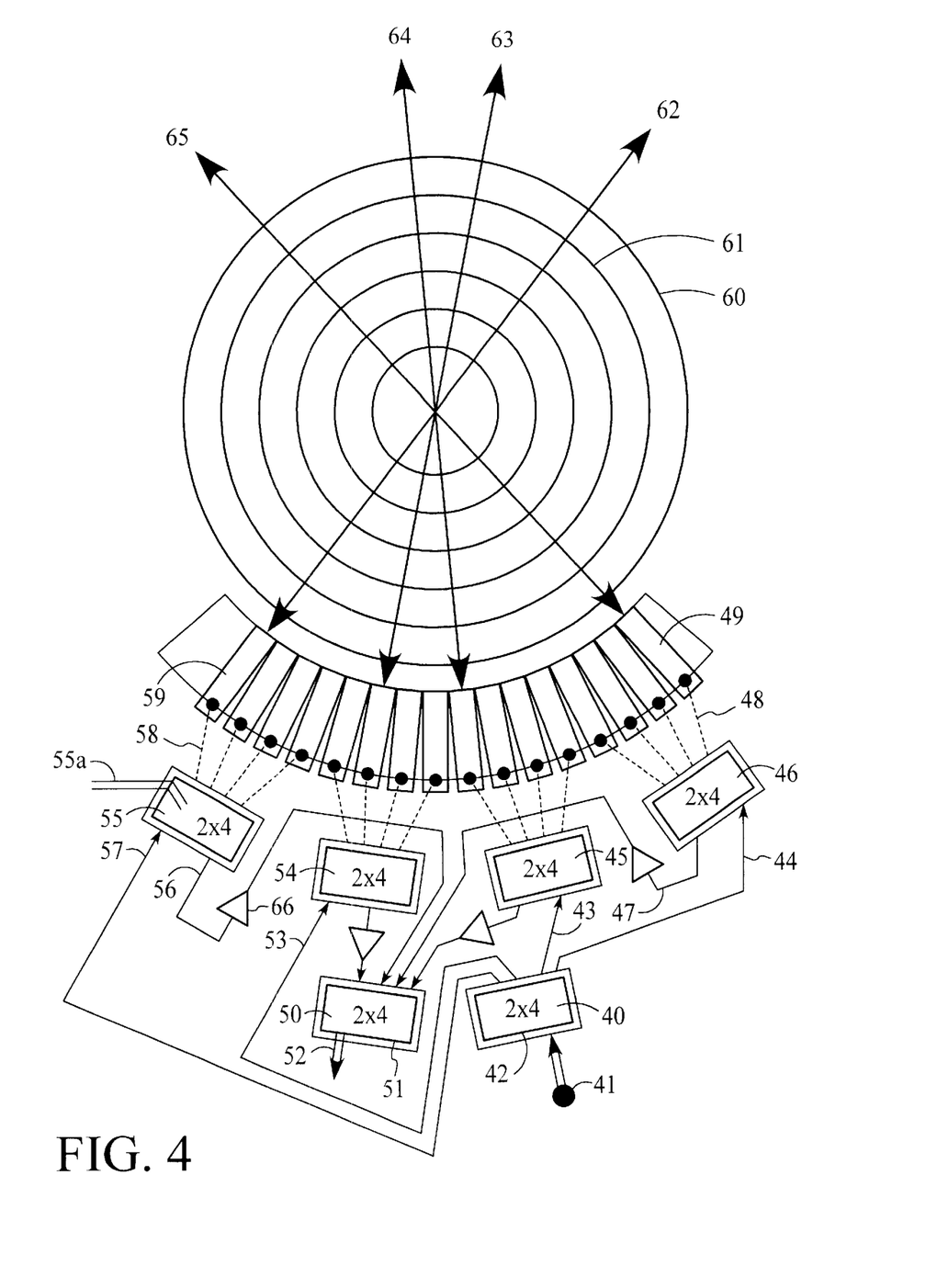
FIG. 4 is a top plan view following FIG. 3, but with low noise amplifiers in the RF switch assembly.

In the design of FIG. 3, the loss from the feeding port through the two cascaded switches to the receive port 52 is typically from 5 to 6 dB. The high noise figure as a result of this high loss could be partially overcome by adding multiple low noise amplifiers (LNA) in the receiving ports of the 2×m switches. FIG. 4 described the LNA incorporation. LNA 66 amplifies the signal from port 56 of switch 55 feeding it to the receive switch 50. Similar LNAs exist for other ports of the receive switch 50. An output port of switch 46 has LNA 76. An output port of switch 45 has LNA 75. An output port of switch 55 has LNA 78. Since LNAs are relatively low cost, the advantage of adding them is significant.

Figure 5:
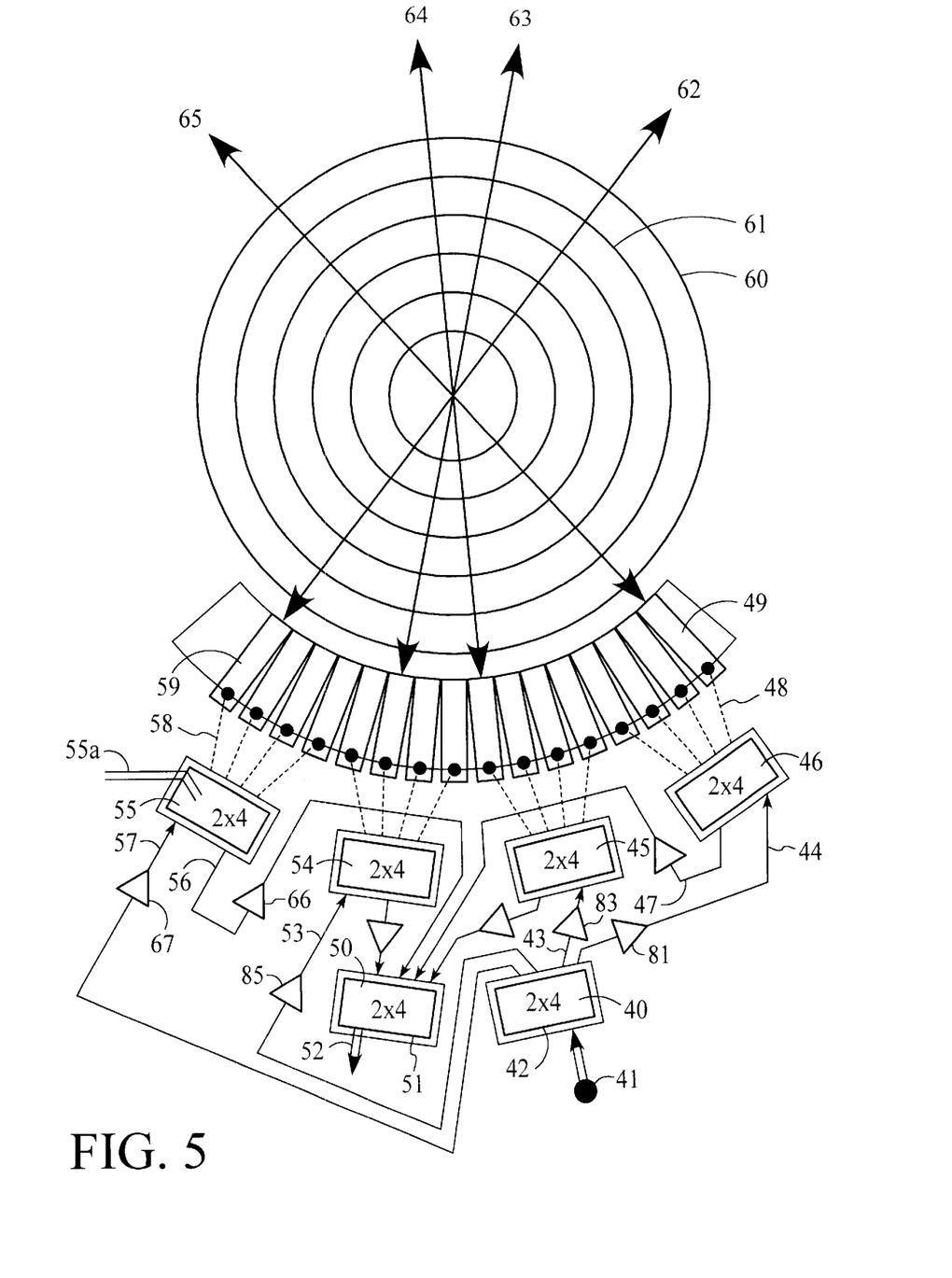
FIG. 5 is a top plan view following FIG. 4, but with power amplifiers in the RF switch assembly.

FIG. 5 describes the case where higher power is necessary. Power amplifiers can be added to the switch array between the switch 40 and the switches 45,46,54 and 55. For example, power amplifier 67 is located between switches 40 and 55. Power amplifiers 81, 83 and 85 may overcome the losses added by the switch 40 and the transmission lines before and after it. The cost of power amplifiers is higher than LNAs, thus a trade off of power versus cost should be considered. Due to close proximity of the power amplifiers and the LNA, careful layout should be applied to avoid coupling.

Figure 6:
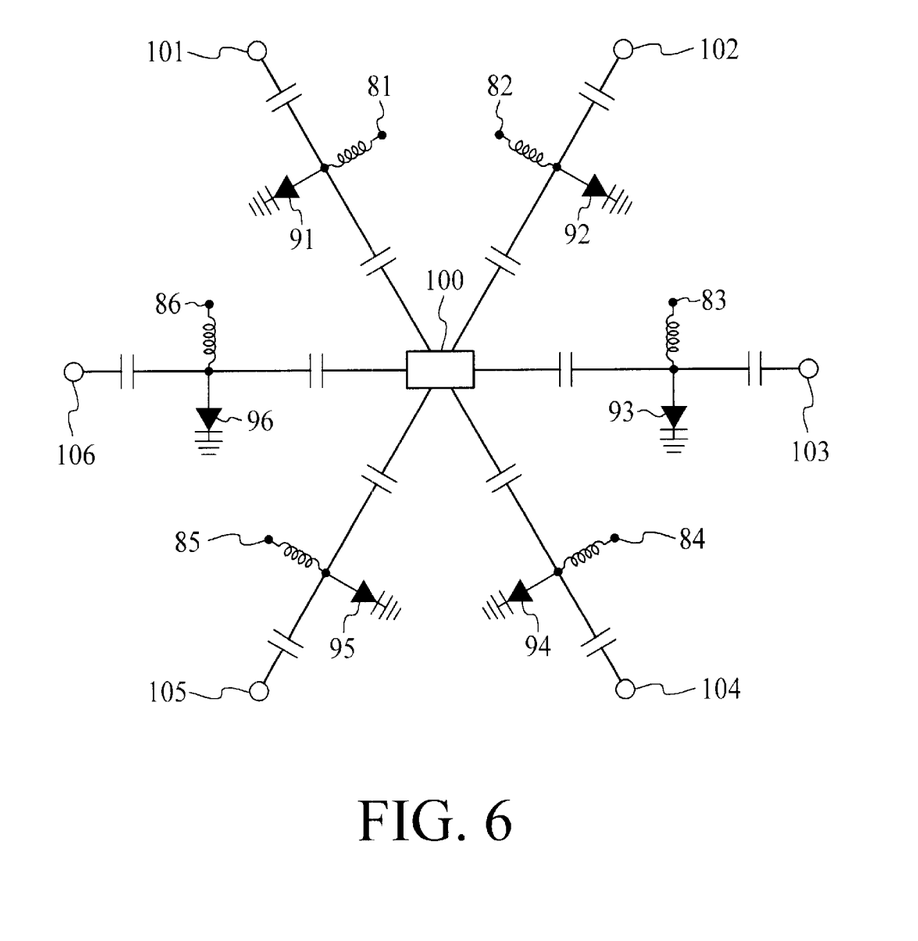
FIG. 6 is an electrical schematic diagram of an RF switch employed in the RF switch assemblies of FIGS. 3–5.

With reference to FIG. 6, a custom made GaAs MMIC of a star shaped array of 6 diodes 91, 92, 93, 94,95 and 96, are each connected to a transmission line corresponding to RF ports 101, 102, 103, 104, 105 and 106. All diodes are biased to short the connected RF transmission line, by conducting to ground with bias applied at the ports 81–86, in an identical manner. When a control voltage is applied to the corresponding ports 81, 82, 83, 84, 85, and 86 the RF conductivity of the diodes is reduced, enabling the transmission of the RF signal from the RF port to the center 100. When the control signal is applied to two diodes, say 81 and 83 simultaneously, an RF signal from port 101 can flow to port 103 and vice versa. This six diode switch, fabricated as a GaAs integrated circuit, is used as a millimeter wave switch for the 20–40 Ghz. The switch is used as a 2×4 switch, and each of the 4 output ports can be switched. The switch is part of the larger 2×16 switch of the present invention. A similar design is also applicable for switches operating at frequencies above ~40 GHz and below ~20 GHz.

By applying the control signal to switch "OFF" any two diodes, say 91 and 94, a low loss RF path is enabled from one RF port to another port, say ports 101 and 104 correspondingly. The switch allows any other combination of diodes to act as switches when the control signal are "OFF". At ~20 to ~40 Ghz the following performance characteristics exist. When all of the diodes are "ON", the port to port isolation is greater than 60 dB. The isolation between a port that is in an "OFF" state and a port that is in an "ON" state is greater than 30 dB. The switch loss in the ~20 to ~40 Ghz range is about 1.5 dB.

In summary, the present invention describes a "data packet spatially switched router" comprising an "RF switch assembly" with multiple feeding ports in close proximity to "RF optics focusing and collimating apparatus", that allows selective reception of data packets from multiple narrow sectors, covering a large field of view and selective transmitting of data packets to multiple narrow sectors covering a large field of view, where the same RF optics apparatus and switch assembly, switch data packets to multiple directions and receive data packets from multiple directions, based on their routing information.

The data packet spatially switched router is used either in the case of wireless time division duplex (TDD) mode systems or frequency division duplex (FDD) mode and can be implemented in mesh topology wireless networks as well as PMP systems (a subset of mesh topology) and Tree and Brunch systems to increase data flow in the same coverage spatial region.

From the above, it will be seen that a network topology may be implemented based on the spatially switched router of the invention. Furthermore, when the spatially switched router for data packets described in the present invention is used in the wireless nodes that comprise wireless data packet networks, a new type of data packet network can be implemented where data can be routed to different directions with timing and directions based on the packet routing information. For example, some of the new network topologies that can be supported are:

(a) Mesh Network—The network nodes incorporate the "spatially switched router". A network node can communicate with multiple neighboring nodes. The nodes use TDD (Time Division Duplex) to communicate with each other. Nodes transmit and receive at different times. The transmit and receive intervals could be done at the same frequency or at different frequencies. In some network designs, the frequencies for transmit and receive are fixed (e.g. by government regulatory agencies. The agencies may assign specific frequencies for use by specific networks). The nodes may also use FDD (frequency division duplex) to communicate with each other. In the FDD case, a node can transmit and receive at the same time, but uses a different frequencies, with large spectral separation to avoid the signal from the transmitter interfering with the received signal.

(b) Mesh of Base Stations, wherein each base station acts also as a point to multipoint distribution node to edge nodes. — This type of mixed network includes two types of nodes. A first group of nodes are the main network nodes that incorporate the "spatially switch router" and operates as "Base Stations" to communicate data packets to and from a second group of nodes. A second group of nodes are simpler and standard in the prior art. These are edge nodes or "leaf nodes" which do not incorporate the spatially switch router of the present invention. Those nodes have usually a single sector defined by a fixed antenna lobe and are fixedly aligned toward the main network node. The nodes of the second group, each receives data from the main node and drop the data to its local port or ports. The nodes of second group also getting data from their local ports and transmitting towards a fixed direction of the main nodes. Once getting packet traffic from an edge node, the main nodes of group one can drop the data packets of traffic directly to the network backbone via its local port, route the data packets to other base stations with whom it communicates via wireless mesh trunking network topology as described in (a) above or route the data packets to other edge nodes of the second group, located in one of its sectors.

As described, the simpler second group nodes communicate by transmitting and receiving data from a specific spatial direction of the main node—which operates as a routing base station. Each of the group two nodes has a fixed beam usually aligned mechanically towards one or more base stations. In cases where the main node do not have line of sight with subscriber edge node another main node which includes the spatially switched router could be located in a position which has line of sight with the main node and the leaf node and acts as a wireless repeater. The point to multipoint section of the network may operate in either TDD mode or FDD mode based on the system design and the regulation for the operating frequency in the area of operation. In FDD the subscriber will communicate with a main node, i.e. a base station, by transmitting at a first frequency and receive information at a second frequency. The base station of the first group will receive the first frequency and will transmit at a second frequency. Combinations of frequencies may be used for different sectors by each one of the first group of nodes avoiding mutual interference and promoting maximum data packet flow in the network.

(c) Basic point to multipoint system—In this network topology case, member of the first group of main nodes incorporate the spatially switched router of the present invention used as base stations. Members of the simpler group two nodes are used as subscriber nodes. The main nodes communicate traffic to the backbone and the simpler subscriber nodes communicate to and from the base stations to the local subscribers. The spatially switched router in this point to multipoint topology allows the adaptive routing of data packets from and towards different sectors covered by the spatially switched router antenna based on data packet routing information. The multiple sectors allow for a high degree of frequency reuse and a higher antenna gain that allows longer distances inside of each sector. Different sectors can be assigned different frequencies based on system design and data packet routing information.

What is claimed is:

1. In a microwave network of the type having a plurality of spatially separated, mutually communicating network nodes, each mutually communicating node having a local microwave transmitter port and a local microwave receiver port, a spatially switched router for data packets comprising:

an RF switch assembly associated with each of said mutually communicating network nodes;

an RF optics focusing and collimating antenna capable of radiating RF energy received from a curved peripheral surface thereof, outwardly spanning an angular range covering the communicating nodes in line-of-sight relation without motion of the antenna, the antenna in RF communication with the RF switch assembly; and a plurality of RF optics microwave waveguide feeding-ports disposed side-by-side about the curved peripheral surface of the antenna, the microwave feeding ports communicating RF energy from the RF switch assembly and the RF optics and collimating antenna and using control signals that synchronously activate the RF switch assembly to route data packets modulating an RF signal from the local transmitter port towards the RF optics microwave feeding-ports, through the antenna and outwardly toward one of the network nodes and from another of the network nodes into the antenna and toward the RF optics microwave feeding-ports and then towards the local receiver port, the RF switch receiving routing information regarding transmission and reception timing schedules and a corresponding direction of transmission and reception of data packets, the switch synchronously switching directions of transmission and reception of data packets between nodes upon the reception and transmission of data packets, wherein the control signals for switching are based on the routing information in the data packets, including updated schedule information for transmission and reception timing and direction of transmission and reception of data packets between communicating nodes.

2. The apparatus of claim 1 where the said switch assembly has RF signal amplification means.

3. The apparatus of claim 2 wherein said signal amplification means is located between the feeding-ports and the receiver port.

4. The apparatus of claim 2 wherein said signal amplification means is located between the local transmitter port and the feeding-ports.

5. The apparatus of claim 1 wherein the RF optics focusing and collimating antenna comprises an RF graded index spherical Luneberg lens designed to focus RF beams in horizontal and vertical planes, where the focusing plane is aligned to feed multiple feeding-ports arranged in a sector around the lens.

6. The apparatus of claim 5 wherein the feeding-ports are waveguide feeders or patch antennas arranged side by side in a partial sector around the spherical lens equator to match with the RF lens focal plane thus designed to form similar beam divergence in the plane parallel to the beam switching plane and the plane perpendicular to the beam switching plane.

7. The apparatus of claim 1 wherein the antenna is a graded index lens with a cylindrical surface about a cylindrical axis, with RF microwave output beams emitted perpendicular to said cylindrical axis, the RF beams angle of divergence defined by the expansion of the output aperture of the RF feeding-ports in the planes containing the axis of symmetry of the graded index cylindrical lens.

8. The apparatus of claim 7 wherein the feeding ports are horn waveguides or patch antennas with an expanded aperture in the plane perpendicular to the beam switching plane, thus forming certain beam divergence in the said perpendicular plane with divergence dimension independent of the cylindrical lens beam forming divergence at the beam switching plane.

9. The apparatus of claim 1 wherein the same feeding-ports are used for transmitting data packets at one time and receiving data packets at a different time.

10. The apparatus of claim 1 wherein the RF switch assembly comprises an integrated circuit switch connected to one or more antenna feeding-ports aiming towards different spatial directions and at least one transmitter input port leading to the local transmitter port and at least one receiver output port leading to the local receiver port.

11. The apparatus of claim 1 wherein the RF switch assembly connected to the feeding-ports comprises 2×m feeding switches, where the number 2 refers to a transmitter-port and a receiver-port and the number m refers to the number of switch ports coupled to the RF optics feeding-ports.

12. The apparatus of claim 1 where the switch assembly feeding of RF feeding-ports comprises n feeding-switches, coupled to a total of n×m (n multiplied by m) RF feeding ports, where m refers to the number of feeding ports coupled to each of the n feeding switches, wherein each of the n feeding-switches is also coupled to an additional L transmitter-switches which switches the RF energy from the local transmitter ports towards the said n feeding-switches and where each of the n receiver-ports is coupled to an additional K receiver-switch which switches the RF energy from the n feeding-switches towards the local receiver ports.

13. The apparatus of claim 12 wherein the L transmitter-switches are further defined by having at least one input port connected to at least one local transmitter.

14. The apparatus of claim 12 wherein the K receiver-switches are further defined by having at least one output port coupled to at least one local receiver.

15. The apparatus of claim 12 wherein the switch assembly further comprises n receiver-ports of the n feeding-switches being coupled to n low noise amplifiers (LNA) before coupling to the n ports of the receiver-switch, thus improving the noise figure of the received signal.

16. The apparatus of claim 15 wherein the low noise amplifiers (LNA) are controlled by control signals that minimize gain when no data packets are switched through them to the RF receiver.

17. The apparatus of claim 12 wherein the switch assembly further comprises n RF power amplifiers (PA) located at the n transmitter inputs of the n, 2×m feeding-switches thus improving the RF power output level at the RF optics feeding ports.

18. The apparatus of claim 17 wherein the high power amplifiers are controlled by control signals that minimize gain when no data packets are switched through them to the feeding-switches.

19. The apparatus of claim 12 wherein the transmitter-switch further comprises a 2×n switch that switch the RF energy from the transmitter port towards the said n, 2×m feeding-switches, where one of the 2 ports is coupled to the RF transmitter and the second of the 2 ports is a transmitter test port, thus enabling monitoring of different parameters including the input RF power from the local transmitter.

20. The apparatus of claim 12 wherein the receiver switch further comprises means for switching the RF energy from the said feeding-switches towards a local receiver port and to an additional test port, thus enabling monitoring of different parameters including received signal level from different feeding ports.

21. The apparatus of claim 12 wherein the n, 2×m feeding-switches are further defined as m equals a number between 1 to 8 ports and n equals a number between 1 to 8 switches to feed n×m RF optics feeding ports where n×m equal a number between 1 to 64.

22. The apparatus of claim 1 where the said RF switch assembly is switched by control signals to allow transmission of data packets modulating an RF energy at a first radio frequency, to one or more network nodes, located in one or more directions and at the same time allows switching one or more feeding ports to receive data packets from one or more network nodes where the receiving data packets modulating an RF energy at a second radio frequency different from the first radio frequency.

23. The apparatus of claim 1 wherein the feeding-ports are arranged side by side forming multiple sectors each covering approximately 7.5 degrees in the switching plane.

24. The apparatus of claim 23 having 16 RF optic feeding-ports that form 16 side by side spatial sectors which cover a total sector size of approximately 120 degrees.

25. The apparatus claim 1 wherein the feeding ports are arranged side by side forming multiple sectors each covering approximately 7.5 degrees in the switching plane and approximately 7.5 degrees in the plane perpendicular to the switching plane.

26. The apparatus of claim 1 wherein the feeding-ports are arranged to feed vertically polarized beams.

27. The apparatus of claim 1 wherein the feeding ports are arranged to feed horizontally polarized beams.

28. The apparatus of claim 1 wherein a first portion of the feeding-ports is arranged to feed vertically polarized beams from the local transmitter and a second portion of the feeding-port is arranged to receive horizontally polarized beams to the local receiver or vice versa, thus reducing interference and increasing isolation between certain groups of transmitting nodes and receiving nodes operating at the same area using closely located frequencies.

29. The apparatus of claim 1 wherein the RF optics focusing and collimating antenna is an RF graded index multilayer cylindrical lens focusing RF beams in a plane perpendicular to the cylindrical lens axis, wherein the focusing plane is aligned to feed a first group of multiple feeding-ports arranged in a sector around the lens for receiving beams of RF energy from neighboring nodes and a separate second group of feeding-ports arranged in a sector around the cylindrical lens at a different level from the first group where the second group generates transmitting beams of RF energy towards neighboring nodes.

30. The apparatus of claim 1 wherein the RF optics focusing and collimating antenna is arranged with said RF optics feeding ports set up with a first group of multiple feeding-ports coupled to a receiver switch assembly that is coupled to the local receiver and a second said group of feeding-ports coupled to a transmitter switch assembly that is coupled to local transmitter, where the first group and second group feeding different RF optics apertures to allow simultaneously transmitting and receiving of data packets.

31. The apparatus of claim 1 wherein the RF optics focusing and collimating antenna is arranged with said RF optics feeding-ports feeding RF refractive elements which are members of the group consisting of: separate spherical Luneberg lenses, separate portions of a cylindrical lens, separate parabolic reflector antennas, separate horn antennas, separate patch array antennas for either simultaneous or separate transmission and receiving of data packets modulating RF energy.

32. The apparatus of claim 31 wherein separate transmit and receive feeding ports have low noise amplifiers located to receive signals directly from the separate receiving feeding-ports.

33. The apparatus of claim 31 wherein separate RF optics feeding-ports are used for transmitting and receiving of data packets wherein RF power amplifiers are incorporated in the transmitting RF optics feeding-ports.

34. The apparatus of claim 1 wherein the antenna is a multi-focal point reflector antenna.

35. The apparatus of claim 1 wherein the RF switch assembly and the feeding-ports form separate transmitting beams and receiving beams, where at specified nodes the beams of the transmitting feeding-ports are polarized perpendicular to the polarization of the beams of the receiving feeding-ports.

36. The apparatus of claim 35 wherein a multiplicity of transceiver nodes is located at remote distances from said specified nodes, with separate feeding-ports for transmitting said beams at a first polarization to be received by a transceiver receiving a beam from a feeding-port associated with the first polarization and receiving beam from a feeding-port associated with a second polarization perpendicular to the first polarization transmitted by said specified nodes.

37. A network of the type having a plurality of spatially separated network nodes comprising:

a first number of nodes in line-of-sight relation having routing information regarding transmission and reception timing and a corresponding direction of transmission and reception for data packets, each node having a local transmitter port and a local receiver port, with spatially switched router apparatus having, an RF switch assembly associated with said first number of network nodes, an RF optics focusing and collimating antenna coupled to the RF switch and RF optics feeding-ports in side-by-side relation connected between the RF switch and the antenna and using control signals that synchronously activate the RF switch assembly to route data packets modulating an RF signal from a local transmitter port towards the RF optics feeding-ports and from the RF optics feeding-ports towards a local receiver port, wherein the control signals are based on the routing information of the data packets, including transmission and reception timing and direction of transmission and reception, as well as updated schedule information for transmission and reception timing and direction of transmission and reception of data packets among the first number of nodes, and a second number of nodes having antennas aligned spatially to communicate in a single direction with nodes of the first number of nodes, wherein the antennas are connected to the local transmitter and receiver ports of the second number of nodes.

38. The network of claim 37 wherein the number of nodes is divided into first and second groups of nodes, wherein the first group receives data packets at one RF frequency from the second group and transmits data packets at a second RF frequency to the second group where the transmit frequency is different from the receive frequency.

39. The network of claim 37 wherein the first number of nodes is configured as base stations in a point-to-multipoint arrangement and the second number of nodes, simple-nodes, are configured as subscriber nodes.

40. The network of claim 37 wherein nodes of the first number of nodes transmit at a first frequency and receive at a second frequency and the second number of nodes, simple-nodes, transmit at the second frequency and receive at the first frequency wherein the first frequency is different from the second frequency.

41. The network of claim 37 wherein a node of the first number of nodes is configured as a repeater to repeat data packets between nodes from the first number of nodes and nodes from the second number of nodes or between nodes from the second number of nodes to another nodes from the second group of nodes.

42. The network of claim 37 wherein nodes from the first number of nodes are each associated with a sector having a feeding port, each feeding port transmitting a different frequency in a different sector and receiving a different frequency in a different sector.

43. The network of claim 42 wherein the different frequencies for transmission and reception in different sectors varies during operation.

44. The network of claim 42 where the said different frequencies in different sectors varies in time based on the routing information derived from the data packets.

* * * * *